Nov. 17, 1953  W. T. ANDERSON, JR  2,659,183
ELECTRICAL CONDUCTOR FOR DISCHARGE DEVICES
Filed Nov. 13, 1950
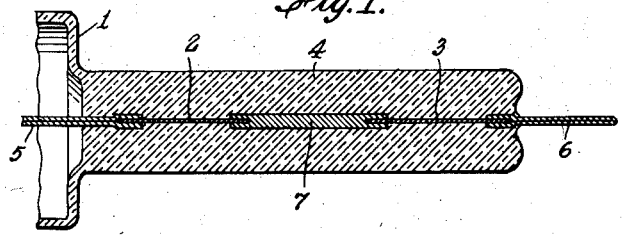
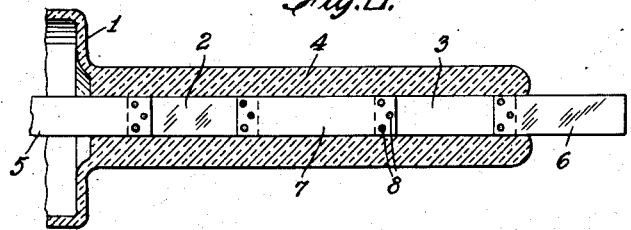
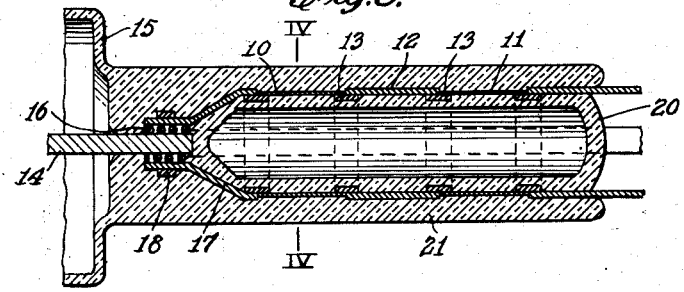
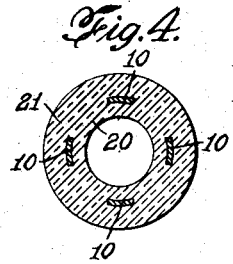
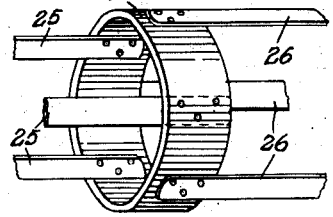
INVENTOR.
WILLIAM T. ANDERSON JR.
BY
ATTORNEY.

Patented Nov. 17, 1953

2,659,183

UNITED STATES PATENT OFFICE 2,659,183

ELECTRICAL CONDUCTOR FOR DISCHARGE DEVICES

William T. Anderson, Jr., Maplewood, N. J., assignor to Hanovia Chemical & Manufacturing Co., Newark, N. J., a corporation of New Jersey Application November 13, 1950, Serial No. 195,401

2 Claims. (Cl. 49—92.5)

As is well known in the art, it is desirable to form at least a portion of the lead-in conductor of an electrical discharge device, such as mercury vapor lamps, as a thin foil of tungsten or molybdenum in order to obtain a tight seal between the vitreous material thereof and the metallic conductor. A lamp seal formed in this way has been illustrated and described in my prior Patent No. 2,231,459.

Although my prior invention has enjoyed considerable success especially for sealing a lead-in conductor in a vapor discharge device of quartz or high silica glass, certain difficulties are encountered when it is used for this particular purpose. In order to seal a thin foil vacuum-tightly into quartz, it has been found that the width of the foil should not exceed about 0.4" and the single foil should not be made to carry more than about 50 amperes, which current carrying capacity is further limited to a value that will not cause the juncture of the thin foil to become overheated and rupture the quartz in which the foil is embedded. In practice these difficulties are met by employing a plurality of foil and metal assemblies sealed into the quartz, whereby the electric current is divided up among the assemblies as in any other electrically parallel arrangement.

There still remains, however, an important limitation on the use of such seals that is not entirely corrected by a mere increase in the number of foils. If a seal of the type herein contemplated is to have a life of practical duration, the junction of the thin foil with outer metal portion of the lead-in conductor should not be allowed to reach the temperature of the rapid oxidation point of molybdenum. The critical temperature for the oxidation of molybdenum is 300° C. Below this temperature, molybdenum and the oxygen in air do not combine to form molybdenum oxide. Oxidation begins at 300° C. and the rate of oxidation accelerates as the temperature increases. Slow oxidation of relatively thick components of a lead-in conductor that are jointed to the thin foil is of no serious consequence, but slow oxidation of the thin foil rapidly reduces its current carrying capacity since the oxide is a poor conductor of electricity. At its junction the thin foil is not sealed vacuum tightly into the quartz and hence it is exposed to contact with the oxygen in air. When oxidation occurs while electric current is passing through the foil, the electrical resistance at the junction increases to such an extent that some instances have occurred in which this junction became incandescent. Under such conditions, the thin foil oxidizes rapidly and arcs form between the metal parts at the junction causing the seal and quartz to rupture. It is due to these causes that some devices, such as short arc mercury lamps having current needs of less than 25 amperes whereby they should normally be expected to operate satisfactorily with only a single lead-in seal, have failed during operation thereof within short periods of only a few minutes, unless other expedients that are explained hereinafter, had been resorted to in order to keep the temperature of the foil junction below 300° C. at all times.

When multiple seals are used as for high current carrying requirements, the electrical discharge device is usually designed to operate at a very high temperature. The heat from the device is conducted back to the lead-in seals and adds to the heat that is generated within the seals from its resistance to the electric current. It is clear, therefore that high current vapor electric devices can not be operated satisfactorily under conditions where there has been a mere increase in the number of foils used. To obtain satisfactory operation of such devices it is usually necessary to cool the seal as with water or an air blast. Also, it has been proposed to increase the length of the seal in order to space the air junction at a substantial distance from the body of the electrical device; however, in many instances this lengthening of the seal limits the utility of the device because of the overall length that is required to keep the seals intact.

An object of the invention is to provide new and improved seals in vitreous materials, such as glass, quartz and the like, for metal conductors, which seals are completely vacuum-tight. Another object is the provision in electrical discharge devices, such as gas or vapor arc lamps, cathode ray tubes and the like, of a conductor of high current carrying capacity sealed into the vitreous discharge vessel in a completely vacuum-tight manner. Still another object is to provide a seal in devices of this type that need not be extended excessively in length or require artificial cooling during its use. Further objects and various advantages of the invention will appear from the following detailed description and from the accompanying drawing, in which:

Fig. 1 is a longitudinal sectional view of a single conductor embedded in a seal constructed in accordance with the invention.

Fig. 2 is a view in section taken on a line through the median of Fig. 1—since line II—II is not shown in Fig. 1, Fig. 3 is a view similar to that of Fig. 1 but of a modified form of the invention, Fig. 4 is a cross sectional view taken on the line IV—IV of Fig. 3, and Fig. 5 is a perspective view of a portion of another modified form of a multiple lead-in conductor for a seal constructed in accordance with my invention.

The present invention consists in essence in providing a relatively thick portion in the thin foils that are used as sealed-in conductors through vitreous materials. By this construction I have found that excessive heat from the electrical device does not pass to that junction of the thin foil which comes in contact with the air, whereby the new seal will have a high current carrying capacity, and yet need not be formed of long length or require artificial cooling as has been necessary heretofore.

The embodiment shown in Figs. 1 and 2 constitutes a single lead-in conductor sealed in the end of an electrical device of the mercury vapor type, designated on the drawing by the reference numeral 1. The thin foils 2 and 3 of the illustrated lead-in conductor are formed to a thickness such as between 0.0005" to 0.0008" at the edges thereof, and not in excess of a thickness of 0.002" in their central portions, i. e. they may be flat with beveled edges or biconvex in cross-section. Electrical connection within the device is made with the portion 2 by means of a heavy foil or rod 5, and portion 3 is joined to the heavy foil or rod 6 which serves as a connection for the electrical current for the operation of the mercury vapor discharge device 1. These elements of the lead-in conductor are formed of molybdenum, or the like, i. e. instead of molybdenum they may be formed of any other refractory high fusing point metal such as tungsten, tantalum, iridium or other high fusing metals of groups V and VI and VIII of the periodic system having relatively high coefficients of thermal expansion.

According to the present invention, a relatively thick portion 7 is provided as an integral part of the lead-in conductor, the thickness of the portion 7 being of 0.002" to 0.1" or more. The portion 7 is joined to the thin foil portions in any suitable manner such as for example, by the spot welds shown at 8. Although I have illustrated the portion 7 as being constituted of a flat strip, it will, of course, be obvious to those skilled in the art, that said portion may be square in cross-section, or otherwise shaped. Also, the various metal parts that form the lead-in conductor may be constructed from a single piece of metal so long as the thicknesses for the various portions thereof are of the magnitudes explained above.

The vacuum tight seal provided by the thin foil 3 prevents the air from contacting the junction of the thin foil 2 and the heavy foil 7. For this reason the thin foil 2 is not harmed by oxidation even though at times during operation of the electrical device the thin foil becomes completely incandescent.

During operation of the device, the quartz or like material 4 remains cooler than the metal components of the lead-in conductor, and although the heavy foil 7 is not sealed vacuum tightly into the quartz, it does become cooled by contact with the quartz. Furthermore, because of its relatively large mass, the heavy foil 7 does not become heated as does a thin foil from the passage of electric current. For these reasons the heavy foil 7 acts to cool the thin foil 2, but what is of most importance, is the fact that the heavy foil prevents the thin foil 3 from becoming heated to a degree where oxidation at the air junction of the foil 3 could occur. The operating temperature of the thin foil 3 remains substantially lower than would be the case if the portions 2, 7, and 3 constituted one continuous thin foil. In fact, in order that a seal with a continuous length of thin foil have a temperature at its air junction as that resulting from my invention, it would need be about twice as long as my new seal.

Many of the electrical devices on which seals of the type herein contemplated are used, contain gases such as xenon, krypton, neon at high pressures, e. g. 5 to 40 atmospheres, or in operation metal vapors such as mercury, cadmium, zinc, and gallium at 20 or more atmospheres pressures. For such devices it is necessary that the thick portion 7 be sealed vacuum tightly from the space within the device, as is provided by the vacuum tight seal at the foil 2. Since a heavy foil can not, by itself be sealed vacuum-tightly in quartz, there will be a small void between the surface of the heavy foil and the quartz material where gases may be compressed and vapors condensed. So long as this void is maintained at a temperature in excess of the envelope of the device as by heat being conducted back along the heavy foil or rod from the electrodes and discharge, the presence of a void is of no practical significance, however, as soon as the temperature in the void becomes equal to or lower than that of the envelope, loss of gas and metal vapor occurs which materially affects the efficiency of the electrical device. The double vacuum-seal arrangement of the invention corrects this condition since the inner seal at 2 prevents gases and vapors from passing out of the space of the electrical device, while the second seal at 3 protects the inner seal from destruction by oxidation.

The invention permits of a substantial reduction in the length of a seal, as, for example from 9" to 5.5". Since a discharge lamp always has at least two seals, i. e. one on each end of its envelope, the use of seals constructed in accordance with my invention materially reduces the overall length of the device. This reduction in length is of especial importance for discharge lamps whereby such lamps are more readily adapted to reflectors.

The invention may be employed for the construction of multiple seals, one form of which is illustrated in Figs. 3 and 4. In these figures, the inner thin foil portion and the outer thin foil portion of the multiple lead-in conductor are designated by the reference numerals 10 and 11 respectively; while the heavy portion, that corresponds to the thick foil 7 of the previously described embodiment, is shown at 12. The heavy portions 12 are suitably connected with the thin portions 10 and 11 by means of the thick foil rings 13. A rod 14 which may be formed of tungsten or the like extends into the space within the electrical device 15. For more suitably supporting the rod 14 in the quartz or like material of the seal a collar or coil 16, is fitted over the end of the rod. Electrical connection between the rod and the inner ends of the thin foils 10 is provided by the leads 17 that are fixed to the coil 16 as with a band 18.

When the parts of the multiple lead-in conductor have been assembled as in the manner described above, the seal for the electrical device is formed by sealing the conductor assembly into quartz or like material. This may be done by fitting the conductor assembly over a hollow quartz core 20 having a wall thickness of about 2.5 mm. and containing a gas at a pressure of more than one-third atmospheres when measured at 20° C., so that when the quartz material of the core is heated to its working temperature, i. e. from about 1800° C. to 2100° C., the pressure within the core will be about 4.5 atmospheres or more. The conductor assembly within the core or tube 20 is then inserted into another tube 21. A shaped quartz spacer is fitted over the rod 14 and the collar 16 so that when fusion occurs, the tubes and the conductor assembly will be uniformly sealed together. The outer tube 21 is then evacuated and the assembled tubes and conductor are heated to about 2100° C. while being rotated in vertical position. During this process the gas within the inner tube 20 expands and forces the walls thereof outwardly against the foil assembly that surrounds it. At the same time atmospheric pressure forces the evacuated outer tube 21 inwardly on the foil assembly whereby the metal parts and the quartz material become intimately contacted to form a vacuum-tight seal. In addition to providing a useful seal that is substantially reduced in length, the arrangement described above may be more easily manufactured since otherwise long multiple thin foils have a tendency to twist during the sealing operation, thereby causing failures as the foil must lie flat within the seal.

In the modification shown in Fig. 5, there is illustrated a portion of a multiple lead-in conductor having three inner thin foils 25 and three outer thin foils 26. In this modification, both the inner foils and the outer foils are joined directly to the ring 27 which performs the function of the thick strips 12 of the embodiment shown in Fig. 3. In order to reduce thermal conduction through the assembly to a minimum, the foils 26 are joined to the ring 27 at points on the ring that are located between the connection points for the foils 25, whereby heat from the foils 25 must pass through a substantial section of the ring 27 before it can reach the outer foils 26.

Without further description it is thought that the features and advantages of the invention will be readily apparent to those skilled in the art, and it will of course be understood that changes in the form and minor details of construction may be resorted to without departing from the spirit of the invention and the scope of the appended claims. Also I desire to have it understood that the term metal as used herein and in the appended claims shall include alloys containing the metals specified.

What I claim is:

1. A seal structure of the class described comprising a vitreous core, a lead-in conductor comprising a plurality of conductor sections extending along the outer surface of said core in substantially parallel relation, each of said sections having two spaced apart thin foil portions connected together by a thick portion, a rod-like metal member in end to end alignment with said core and having one end connected to the near ends of said sections, at least one heavy portion connected to the opposite end of said sections, a vitreous jacket surrounding said core, said thin foil portions being vacuum-tightly fused between the adjacent surfaces of said core and jacket, said thick portion being firmly fused between said core and jacket, said heavy portion and said rod-like member having their inner ends firmly fused in the end of the vitreous material of said core and jacket and having their outer ends emerging from said vitreous material.

2. In an electrical discharge device a vacuum-tight seal, comprising a plurality of conductor strips of refractory high fusing metal, a vitreous core, a metal ring around said core and integral with said strips, said strips being arranged substantially parallel with each other and extending along the outer surface of said core, each of said strips having a thin foil portion between the ends thereof and on both sides of said ring, a vitreous jacket around said core and of such size as to cover the thin foil portions, said thin foil portions being vacuum-tightly fused between adjacent surfaces of said core and jacket, and said ends of said strips and said ring being firmly bonded between said core and said jacket.

WILLIAM T. ANDERSON, Jr.

References Cited in the file of this patent

UNITED STATES PATENTS

| Number | Name | Date |
|---|---|---|
| 2,138,224 | Barasch | Nov. 29, 1938 |
| 2,159,794 | Hagen | May 23, 1939 |
| 2,190,302 | Waldschmidt | Feb. 13, 1940 |
| 2,200,939 | Trebbin | May 14, 1940 |
| 2,215,300 | Ryde | Sept. 17, 1940 |
| 2,231,459 | Anderson | Feb. 11, 1941 |
| 2,405,089 | Craig | July 30, 1946 |

FOREIGN PATENTS

| Number | Country | Date |
|---|---|---|
| 476,488 | Great Britain | Dec. 6, 1937 |
| 525,772 | Great Britain | Sept. 4, 1940 |